US010689728B2

(12) United States Patent
Paatero et al.

(10) Patent No.: US 10,689,728 B2
(45) Date of Patent: Jun. 23, 2020

(54) RENEWABLE ISOPARAFFINS AS DILUENT IN HYDROMETALLURGICAL LIQUID-LIQUID EXTRACTION PROCESS

(71) Applicants: OUTOTEC (FINLAND) OY, Espoo (FI); NESTE CORPORATION, Espoo (FI)

(72) Inventors: Erkki Paatero, Helsinki (FI); Rami Saario, Espoo (FI); Jukka Kortelainen, Espoo (FI); Maija Rouhiainen, Oulu (FI); Virpi Rämö, Porvoo (FI)

(73) Assignees: OUTOTEC (FINLAND) OY, Espoo (FI); NESTE CORPORATION, Espoo (FI)

( * ) Notice: Subject to any disclaimer, the term of this patent is extended or adjusted under 35 U.S.C. 154(b) by 0 days.

(21) Appl. No.: 16/315,942

(22) PCT Filed: Jul. 4, 2017

(86) PCT No.: PCT/FI2017/050500
§ 371 (c)(1),
(2) Date: Jan. 7, 2019

(87) PCT Pub. No.: WO2018/007672
PCT Pub. Date: Jan. 11, 2018

(65) Prior Publication Data
US 2019/0249273 A1    Aug. 15, 2019

(30) Foreign Application Priority Data
Jul. 5, 2016   (FI) ..................................... 20165563

(51) Int. Cl.
*C22B 3/16*   (2006.01)
*C22B 3/30*   (2006.01)
(Continued)

(52) U.S. Cl.
CPC .......... *C22B 3/1633* (2013.01); *C22B 3/0006* (2013.01); *C22B 3/0017* (2013.01);
(Continued)

(58) Field of Classification Search
None
See application file for complete search history.

(56) References Cited

U.S. PATENT DOCUMENTS

| | | | | |
|---|---|---|---|---|
| 3,224,873 | A | * | 12/1965 | Swanson ............... C22B 3/0017 205/581 |
| 2004/0052707 | A1 | | 3/2004 | Ocallaghan et al. |
| 2008/0003154 | A1 | | 1/2008 | Ocallaghan et al. |

FOREIGN PATENT DOCUMENTS

| | | |
|---|---|---|
| EP | 2368967 A1 | 9/2011 |
| FI | 100248 B | 10/1997 |
| WO | 2015101837 A2 | 7/2015 |

OTHER PUBLICATIONS

Encyclopedia Britannica ("Kerosene", accessed online at https://www.britannica.com/science/kerosene on Jun. 27, 2019, pp. 1-2). (Year: 2019).*

(Continued)

*Primary Examiner* — Clare M Perrin
(74) *Attorney, Agent, or Firm* — Buchanan Ingersoll & Rooney PC

(57) ABSTRACT

The present disclosure relates to hydrometallurgical technologies wherein liquid-liquid extraction, also called solvent extraction, is used to separate and concentrate metal ions. Exemplary embodiments relate to solvent extraction of copper and a diluent useful in copper solvent extraction. A bio-based composition can fulfil physico-chemical proper- (Continued)

ties that are desired for solvent extraction. Moreover, a composition is disclosed, which in addition to providing more environmental friendly alternative, can also improve the solvent extraction process of copper.

16 Claims, 5 Drawing Sheets

(51) Int. Cl.
  *C22B 3/26*   (2006.01)
  *C22B 15/00*   (2006.01)

(52) U.S. Cl.
  CPC ............ *C22B 3/16* (2013.01); *C22B 15/0071* (2013.01); *C22B 15/0084* (2013.01); *Y02P 10/234* (2015.11); *Y02P 10/236* (2015.11); *Y02P 20/582* (2015.11)

(56) References Cited

OTHER PUBLICATIONS

National Geographic Society ("Petroleum", accessed online at https://www.nationalgeographic.org/encyclopedia/petroleum/ on Jun. 27, 2019, pp. 1-19). (Year: 2019).*
Chad W. Brown, "Property-Performance Relationships of Commercial Diluents in Sub-Sahara Africa Copper Solvent Extraction Conditions Image Goes Here", 8th Southern African Base Metals Conference Livingstone, Zambia, Jul. 6-8, 2015, pp. 1-23.
Finnish Search Report dated Jan. 13, 2017.
Francisco Jose Alguacil et al., "Modelling copper (II) liquid-liquid extraction: the system Acorga M5640-Exxsol D100-CuS04—H2S04", Journal of Chemical Research, vol. 3, Mar. 31, 2004, pp. 196-197.
International Search Report (PCT/ISA/210) dated Sep. 27, 2017, by the Finnish Patent Office as the International Searching Authority for International Application No. PCT/FI2017/050500.
Written Opinion (PCT/ISA/237) dated Sep. 27, 2017, by the Finnish Patent Office as the International Searching Authority for International Application No. PCT/FI2017/050500.
CYTEC Technology ahead of its time®, Technology Note, Metal Extractants, "ACORGA® Extraction Reagents: Standard Test Methods", 2005, pp. 1-12.

* cited by examiner

RENEWABLE ISOPARAFFINS AS DILUENT IN HYDROMETALLURGICAL LIQUID-LIQUID EXTRACTION PROCESS

FIELD OF THE INVENTION

The present invention relates to hydrometallurgical technologies wherein liquid-liquid extraction, also called solvent extraction, is used to separate and concentrate metal ions. More particularly the invention relates to solvent extraction of copper and a diluent useful in copper solvent extraction.

BACKGROUND OF THE INVENTION

Liquid-liquid extraction also known as solvent extraction and partitioning is a method to separate compounds based on their relative solubilities in two different immiscible liquids, usually water and an organic solvent. Solvent extraction is commonly used in metal separation processes, allowing metals to be extracted from aqueous solutions by using organic extraction solutions. Industrially the largest application of solvent extraction is extraction of copper from aqueous sulfuric acid solutions following leaching of the copper ore.

In hydrometallurgy the aqueous solution from leaching, the pregnant leach solution, is contacted in a mixer-settler with an extractant, i.e. an organic extraction reagent dissolved in an organic diluent, to selectively transfer the desired metal from the aqueous phase to a water-immiscible phase. After phase separation, the aqueous solution, the raffinate, is recycled back to leaching and the organic water-immiscible phase is moved to another mixer-settler where it is contacted with an aqueous stripping solution to create a more concentrated, and more pure aqueous solution of the metal for reduction. Metal extraction requires usually two or more consecutive extraction stages to remove the target metals from the aqueous feed.

Concerning the technical performance of the solvent extraction process the mixers can be operated either aqueous continuous (i.e. organic droplets are dispersed into water) or organic continuous (vice versa). Due to various reasons one or the other gives more over-all optimal result for the solvent extraction process. The phase disengagement rate is highly dependent on the phase continuity and usually the organic continuous dispersion separates faster. However, in many cases the over-all process optimum is better with aqueous continuous system. Faster phase separation rates in a settler enable either smaller settlers, less organic phase inventory or higher flow rates and productivity in existing plants. For the operability and trouble shooting of a solvent extraction plant it is an advantage that the difference between aqueous and organic continuous systems is not too big especially in start-up situations or accidental phase inversion events.

The commonly used metal extraction reagents in solvent extraction of copper are various hydroxyoxime derivatives which are able to form a chelate with copper ion. This copper complex preferably distributes into the organic phase during the extraction stage.

Conventional diluents used in copper solvent extraction plants originate from fossil crude oil. A wide range of commercially available hydrocarbon diluents exists. One of the commonly used diluent is e.g. Shellsol® D70 which contains about 55% paraffinic and 45% naphthenic hydrocarbons with an average of 11-14 carbon atoms.

Today there is a global demand to replace fossil solvents and VOC (volatile organic compounds) containing diluents with alternatives due to environmental and regulatory pressures and health concerns as well as increasing price and unsteady support of crude oil.

In an attempt to find alternatives a possibility of using biodiesel such as "Fatty Acid Alkyl Esters" (FAAE) and especially "Fatty Acid Methyl Esters (FAME) as diluent in metal extraction has been considered. However, the physical and chemical properties of these are not suitable for metal extraction. Moreover, the esters are subject to hydrolysis in high acidic condition, which is the case e.g. in the solvent extraction of copper. Acid catalyzed hydrolysis of the esters results in a formation of the corresponding carboxylic acids which are known to act as metal extractant for some impurity metals.

BRIEF DESCRIPTION OF THE INVENTION

An object of the present invention is thus to provide a composition for solvent extraction of copper so as to overcome the above mentioned problems and to alleviate the above mentioned disadvantages. The objects of the invention are achieved by a novel composition for metal extraction solution comprising an alternative diluent which is characterized by what is stated in the independent claims. The preferred embodiments of the invention are disclosed in the dependent claims.

There has been a search for potential bio-derived diluents with diversity of physico-chemical properties that are required for solvent extraction. The invention is based on the unexpected realization that when replacing the fossil based diluent with a renewable isoparaffinic diluent the phase disengagement rate was significantly improved.

An advantage of the novel composition is that it provides faster phase separation rates in a settler enabling either smaller settlers, less organic phase inventory or higher flow rates and productivity in existing plants. Furthermore, the results shown in the invention imply that the novel composition is less subject to diluent degradation.

The present invention shows that by replacing only part of a conventional fossil based component in the composition for solvent extraction with a renewable isoparaffinic component, the solvent extraction process of copper is improved.

Evaporation of volatile organic compounds from the organic solvent phase is decreased in a system wherein the conventional organic extraction diluent is partly or totally replaced by a renewable isoparaffinic diluent. In addition evaporation loss of organic solvent phase at the operation temperature (typically 40-60° C.) is significantly reduced in a system wherein conventional organic extraction diluent is replaced by a renewable isoparaffinic diluent.

The invention provides a biobased composition which fulfills physicochemical properties that are required for solvent extraction. Moreover, the invention provides a composition, which in addition to providing more environmental friendly alternative, also improves the solvent extraction process of copper.

BRIEF DESCRIPTION OF THE DRAWINGS

In the following the invention will be described in greater detail by means of preferred embodiments with reference to the attached drawings, in which.

Figure 3:
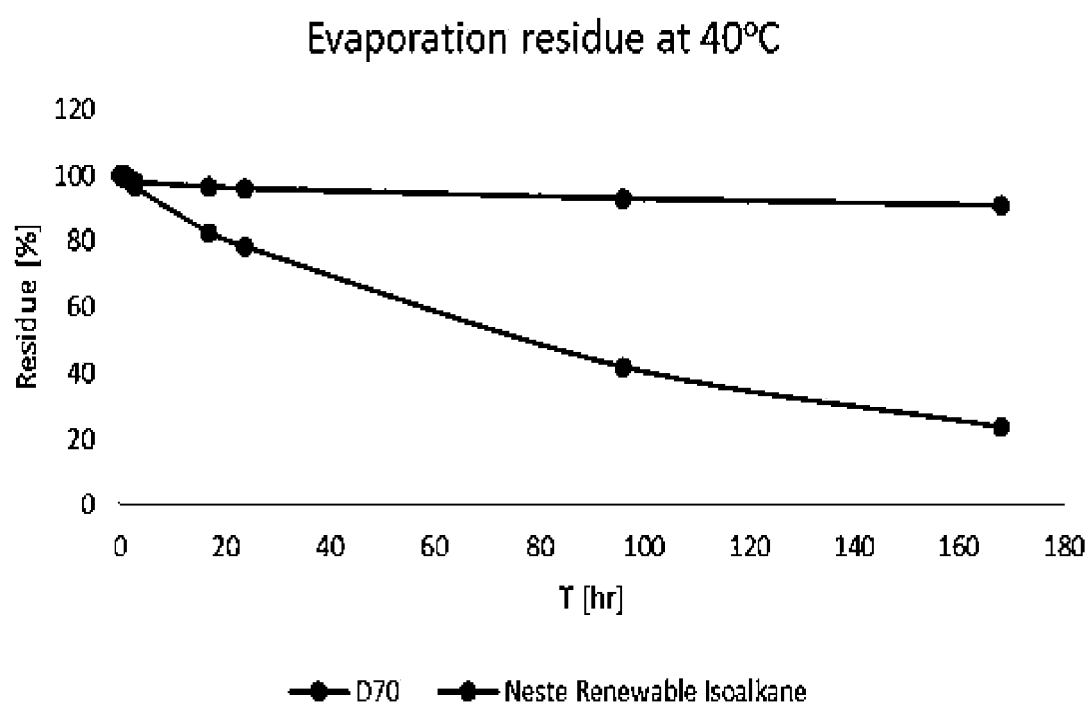
Figure 4:
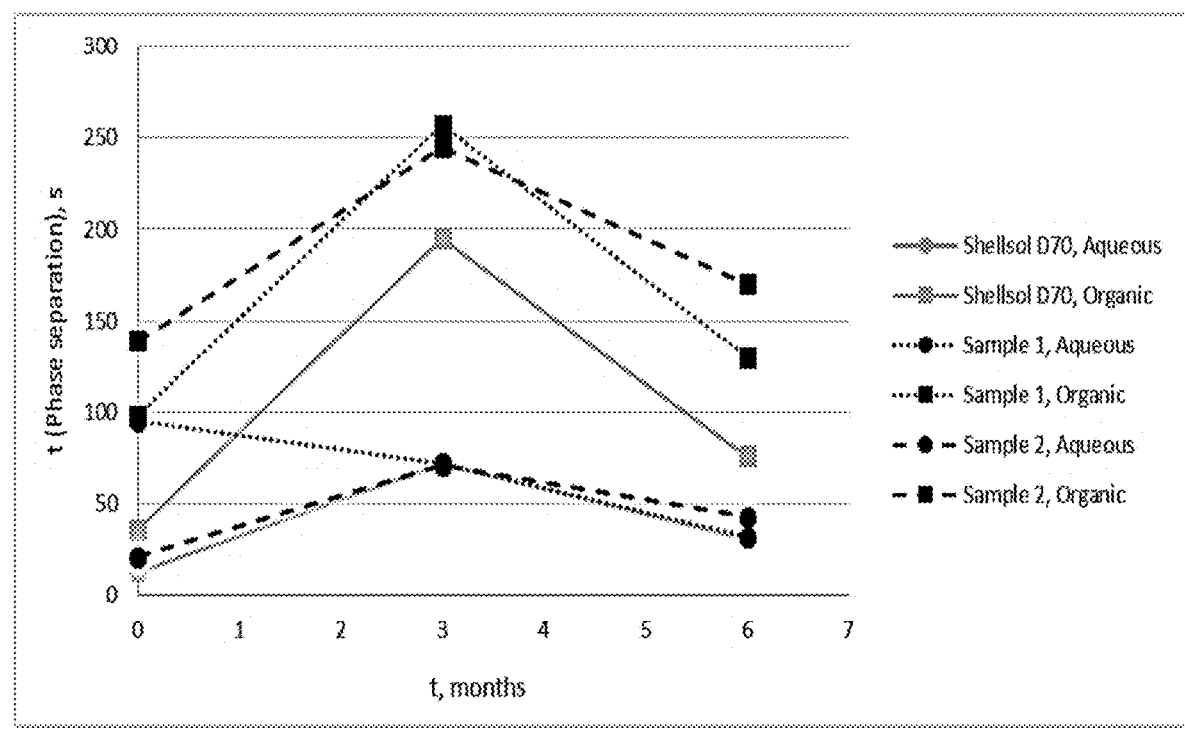
Figure 5:
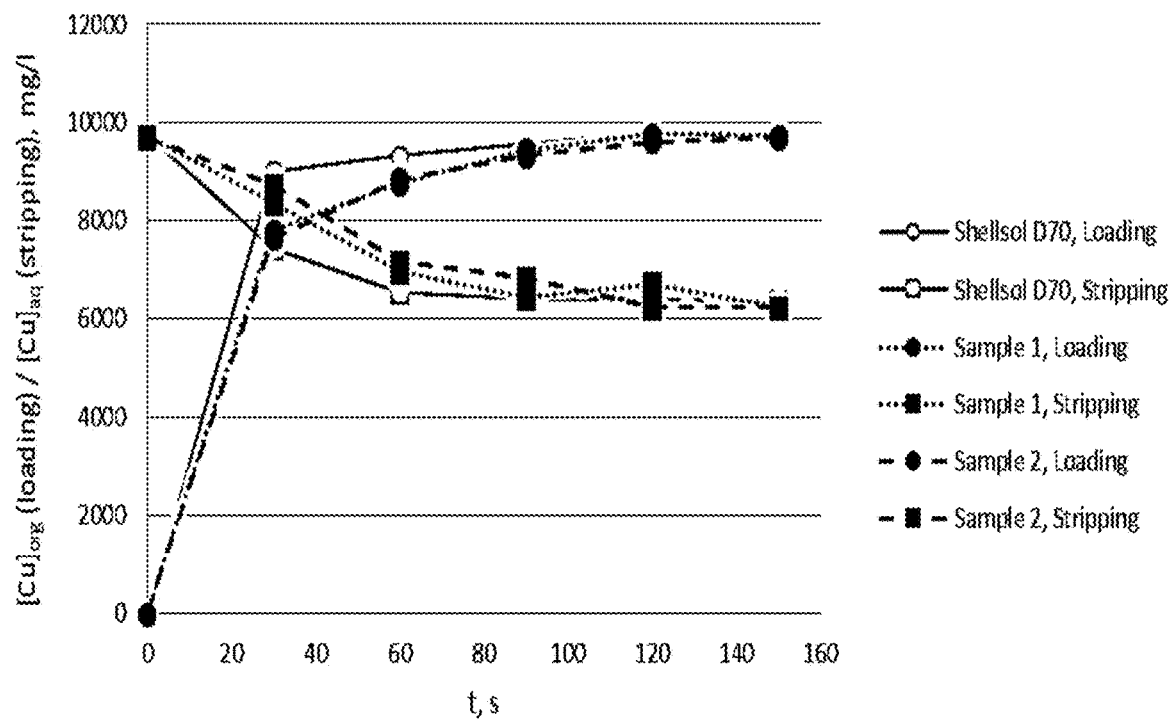

FIG. 3 shows evaporation residue of Shellsol® D70 and Neste Renewable Isoalkane at 40° C. 77 g sample was put in oven and weighed at selected intervals. Two parallel samples were studied;

FIG. 4 shows phase disengagement tests with stressed organic phase. The prepared diluent consisted of either totally of Shellsol® D70 or of type 1 and type 2 Neste Renewable Isoalkane, wherein carbon number distribution of sample 1 used in the example was: 8 wt-% C15 hydrocarbons, 17 wt-% C16 hydrocarbons, 24 wt-% C17 hydrocarbons and 37 wt-% C18 hydrocarbons. Carbon number distribution of sample 2 used in the example was: 12 wt-% C15 hydrocarbons, 31 wt-% C16 hydrocarbons, 16 wt-% C17 hydrocarbons and 32 wt-% C18 hydrocarbons; and FIG. 5 shows kinetic and equilibrium laboratory tests with stressed organic phase. The prepared diluent consisted of either totally of Shellsol® D70 or Neste Renewable Isoalkane (sample 1 and sample 2). Carbon number distribution of sample 1 used in the example was: 8 wt-% C15 hydrocarbons, 17 wt-% C16 hydrocarbons, 24 wt-% C17 hydrocarbons and 37 wt-% C18 hydrocarbons. Carbon number distribution of sample 2 used in the example was: 12 wt-% C15 hydrocarbons, 31 wt-% C16 hydrocarbons, 16 wt-% C17 hydrocarbons and 32 wt-% C18 hydrocarbons.

DETAILED DESCRIPTION OF THE INVENTION

The present invention relates to liquid-liquid extraction of metals, especially to liquid-liquid extraction of copper, wherein improvement of the liquid-liquid extraction process is achieved by using a novel extraction solvent composition.

Specifically, the present invention relates to a biobased composition for metal extraction of copper, comprising a metal extraction reagent in a diluent, wherein the diluent comprises renewable isoparaffins alone or in blend with a conventional fossil solvent based diluent.

More specifically, the invention relates to a biobased composition comprising 5-40 vol-% metal extraction reagent and 60-95 vol-% diluent, which diluent comprises 10-100 wt % first organic diluent, and optionally 0-90 wt % second organic diluent, wherein the first organic diluent is a mixture of hydrocarbons comprising 80-98 wt % C15-C20 hydrocarbons having at least 60 wt % isoparaffins from the total weight of hydrocarbons, and the second organic diluent comprises naphthenes more than 10 wt %, preferably 20-50 wt %.

A solvent is a substance that dissolves a solute (a chemically different liquid, solid or gas), resulting in a solution. Diluent is used as a term in solvent extraction for an inert organic solvent in which a metal extraction agent (extractant) is dissolved. In solvent extraction the diluent can be used as a solvent to dissolve and dilute an extractant as well the extractant-metal complexes and so that the extractant is suitable for use in a liquid-liquid extraction process.

The biobased composition, as used herein, means that a part of the composition originates from renewable biological raw materials. The renewable biological raw material can be originated from plants or animals. The material can be selected from vegetable oils, animal fats, fish oils and mixtures thereof. Examples of suitable biological raw materials include, but are not limited to, rapeseed oil, canola oil, colza oil, tall oil, sunflower oil, soybean oil, hemp oil, olive oil, linseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Further condensation products, esters, or other derivates obtained from biological raw materials may also be used as starting materials. Also recycled raw materials of biological origin are suitable.

The oil derived from a biological raw material is hydrotreated and isomerized. Examples of such process is presented in FI100248, Examples 1-3. In accordance with the invention isoparaffins derived from renewable biological raw material are used as the first organic diluent in the composition. The renewable isoparaffins are a mixture of hydrocarbons (isoalkanes) comprising 80-98 wt % C15-C20 hydrocarbons having at least 60 wt % isoparaffins from the total weight of hydrocarbons. The first organic diluent in the composition may optionally have 0.01-5 wt % C21-C36 hydrocarbons and 0.01-15 wt % C1-C14 hydrocarbons.

The first organic diluent comprises 0-5 wt % naphthenes, preferably 0-2 wt % naphthenes, and 100-95 wt % paraffins, preferably 100-98 wt % paraffins based on the total weight of the composition.

The first organic diluent is biobased. The 14C isotope content of the first organic diluent is more than 90%, preferably more than 99%. The 14C isotope content denotes to the biogenic content of the sample. Radioactive carbon isotope 14C beta decay can be detected by liquid scintillation counting. In fossil materials 14C is fully decayed whereas in biobased materials the 14C isotope is present in amount relative to the amount produced in the atmosphere.

In some embodiments the first organic diluent comprises paraffins, wherein of the total paraffins 5-15 wt % is C15, 10-35 wt % is C16, 10-30 wt % is C17, 20-45 wt % is C18, more than 0-5 wt % is C19 and more than 0-5 wt % is C20. The carbon number denotes to carbon atoms in each paraffin molecule. The first diluent comprises more than 0-5 wt % C19 and C20 meaning that the amount of these paraffins may be from very low up to 5%. Preferably the total amount of isoparaffins in the first organic diluent is at least 85 wt %, 90 wt %, 93 wt % and 95 wt %.

In some embodiments the first organic diluent comprises C15 hydrocarbons comprising 5-20 wt % n-paraffins and 80-95 wt % i-paraffins, C16 hydrocarbons comprising 0.5-15 wt % n-paraffins and 85-99.5 wt % i-paraffins, C17 hydrocarbons comprising 3-15 wt % n-paraffins and 85-97 wt % i-paraffins, C18 hydrocarbons comprising 0.1-10 wt % n-paraffins and 90-99.9 wt % i-paraffins, C19 hydrocarbons comprising 0.1-15 wt % n-paraffins and 85-99.9 wt % i-paraffins, and C20 hydrocarbons comprising 0.1-10 wt % n-paraffins and 90-99.9 wt % i-paraffins. n-paraffin denotes normal paraffins and i-paraffin isoparaffins.

The first organic diluent used in the composition of the invention comprises impurities (Ca, Cu, Fe, K, Mg, Mo, Na, Ni, Si, P, Pb, V, Zn, Mn) preferably less than 0.1 mg/kg determined by method ASTMD5185. The first organic diluent alone or as part of the metal extraction diluent composition has positive effect on the physical performance in solvent extraction.

The second organic diluent in the composition of the invention comprises naphthenes more than 10 wt %, preferably 20-50 wt %. Typically it is fossil based hydrocarbon solvent. The term fossil is used herein to denote diluent components or compositions that are naturally occurring and derived from nonrenewable sources. Examples of such nonrenewable resources can include petroleum oil/gas deposits, shale oil/gas deposits, natural gas deposits, coal deposits, and the like, and combinations thereof, including any hydrocarbon-laden deposits that can be mined/extracted from ground/underground sources. Fossil fuels in general are considered non-renewable resources. The term fossil also refers herein to the wastes of non-renewable sources. Diluents useful in the invention include any mobile organic diluent, or mixture of diluents, which is immiscible with water and inert under the extraction conditions to the other materials present. It may be any conventional hydrocarbon diluent used in copper solvent extraction. Such a diluent is e.g. Shellsol® D70.

The composition of the invention may contain as a diluent only the first organic diluent, however, the diluent may also be a mixture of the first organic diluent and the second organic diluent. In some embodiments the composition comprises 15 vol-%-25 vol-% metal extraction reagent and 75 vol-%-85 vol-% diluent, from which diluent 10 to 90 wt % is first organic diluent and 10-90 wt % is second organic diluent.

In another embodiment the composition comprises 15 vol-%-25 vol-% metal extraction reagent and 75 vol-%-85 vol-% diluent, from which diluent 10%-30 wt % is first organic diluent, and 70%-90 wt % is second organic diluent.

The composition of the invention comprises of an extraction reagent and a hydrocarbon diluent, whereby the extraction reagent is preferably a hydroxyoxime derivative, whose oxime group is either an aldoxime or ketoxime in structure. This, the liquid chelating cation exchanger, chelates the cationic copper in the organic phase. Examples of particularly suitable hydroxyoximes are orthohydroxyarylketoximes, orthohydroxyarylaldoximes and mixtures thereof. Both the ketoximes and the aldoximes are viable copper extraction agents. However, the aldoximes are more efficient than the ketoximes and they are more selective in respect of iron.

Ketoximes and aldoximes of the present invention preferably have the general formula (I)

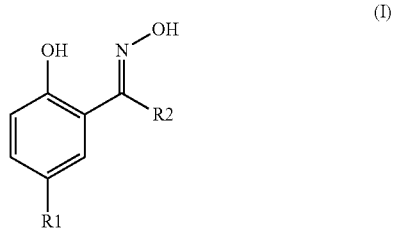

(I)

wherein R1 is C8-15-alkyl and R2 is H, methyl or phenyl.

In addition to these the organic extraction solution may comprise an organic modifying agent that belongs to at least one of the groups: alcohol, phenol, ester, diester, ether, diether, ketone, amide or nitrile. There are several commercial extractants belonging to the hydroxyoximes; for example ACORGA® M5640 by Cytec Solvay Group which is used in the examples hereafter.

The present invention further relates to use of hydrocarbons comprising 80-98 wt % C15-C20 hydrocarbons having at least 60 wt % isoparaffins from the total amount of hydrocarbons in liquid-liquid extraction of metals, especially in solvent extraction of copper. The use of these hydrocarbons allows to contribute to an environmentally sustainable solvent extraction industry.

EXAMPLES

Example 1

Kinetic and equilibrium laboratory tests were carried out according to standard procedures (see "ACORGA® Extraction Reagents: Standard Test Methods" In Cytec Technology Note, Cytec Industries 2005.) The conditions were: Aqueous phase: 6 g/L Cu, 1 g/L $Fe^{3+}$, 60 g/L $SO_4$, initial pH=2.8, temperature 22° C., phase volume ratio 1:1.

Organic phase: 20 vol-% Metal extraction reagent and 80 vol-% diluent.

Metal extraction reagent used was ACORGA® M5640 by Cytec Solvay Group.

Diluent was freshly prepared and consisted of either totally of Shellsol® D70 or of a mixture having 80 vol-% Shellsol® D70 and 20 vol-% of Neste Renewable Isoalkane (renewable isoparaffin).

Figure 1:
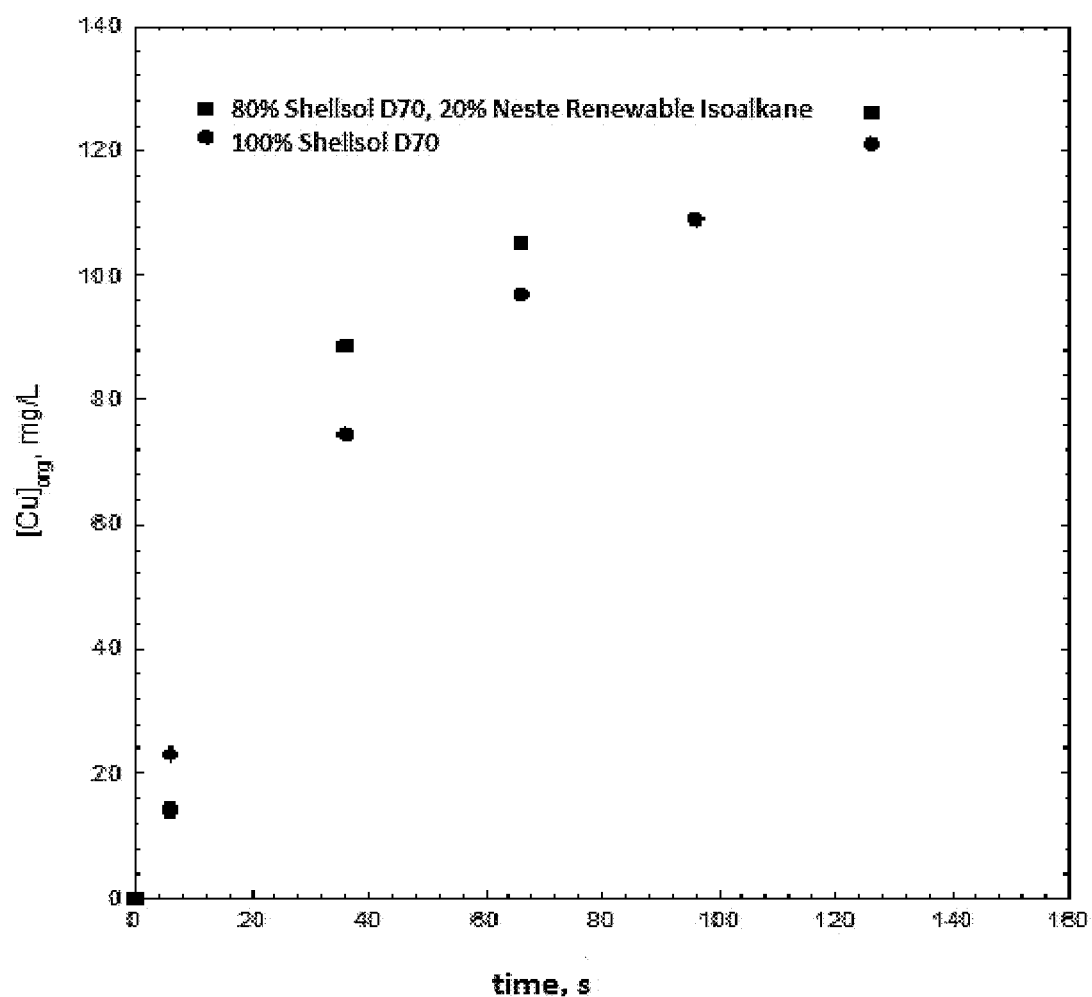
FIG. 1 shows a kinetic and equilibrium tests with a conventional and a renewable diluent in copper extraction solution.

Carbon number distribution of the Neste Renewable Isoalkane used in the example (and the following examples) was: 8 wt-% C15 hydrocarbons of which 11 wt-% n-paraffins and 89 wt-% i-paraffins, 17 wt-% C16 hydrocarbons of which 8 wt-% n-paraffins and 92 wt-% i-paraffins, 24 wt-% C17 hydrocarbons of which 8 wt-% n-paraffins and 92 wt-% i-paraffins, 37 wt-% C18 hydrocarbons of which 2 wt-% n-paraffins and 98 wt-% i-paraffins Results of the kinetic experiments are shown in FIG. 1. The corresponding equilibrium values area in Table 1:

TABLE 1

| Diluent system | Metal loading R, % | |
|---|---|---|
|  | Cu | Fe |
| 100% Shellsol ® D70 | 81.6 | <0.8 |
| 80 vol-% Shellsol ® D70, 20 vol-% Neste Renewable Isoalkane | 84.0 | <0.8 |

The test demonstrates the effect of the renewable isoparaffinic diluent (Neste renewable isoalkane) on the extraction kinetics for copper (FIG. 1) and copper loading and iron rejection (Table 1).

Example 2

Phase disengagement tests were carried out in laboratory conditions. The tests were carried out so that the agitation after copper solvent extraction in the mixer was stopped and the separation of the two liquid phases was then visually monitored. The phase continuity was controlled during the mixing so that it was either organic phase continuous or aqueous phase continuous. The "Phase Disengagement time" was determined from the recorded height of the settled aqueous phase according to the method described on page 5 in "ACORGA® Extraction Reagents: Standard Test Methods/Phase Disengagement" in Cytec Technology Note, Cytec Industries 2005.

The Phase Disengagement tests were made in the following conditions.

Aqueous phase: 6 g/L Cu, 1 g/L $Fe^{3+}$, 60 g/L $SO_4$, initial pH=2.8, temperature 22° C., phase volume ratio 1:1.

Organic phase: 20 vol-% Metal extraction reagent and 80 vol-% diluent.

Metal extraction reagent used was ACORGA® M5640 by Cytec Solvay Group.

Diluent was freshly prepared and consisted of either totally of Shellsol® D70 or of a mixture having 80 vol-% Shellsol® D70 and 20 vol-% of Neste Renewable Isoalkane.

Results are shown in Table 2.

TABLE 2

| Diluent system | Phase Disengagement time, s Phase continuity | |
|---|---|---|
| | Organic | Aqueous |
| 100% Shellsol ® D70 | 28 | 112 |
| 80 vol-% Shellsol ® D70, 20 vol-% Neste Renewable Isoalkane | 26 | 87 |
| 100% Neste Renewable Isoalkane | 67 | 57 |

The test demonstrates the effect of the Neste renewable isoalkane on the physical performance in solvent extraction contacting apparatus. The results show that an addition of the Neste renewable isoalkane diluent has a significant positive effect in the extraction stage when the system is aqueous phase continuous (Table 1).

Example 3

The phase disengagement tests as disclosed in Example 2 were repeated using the same organic phase mixtures except that the organic phase was first stressed for two weeks by agitating it with a 500 g/L sulfuric acid solution using a 1:1 phase volume ratio.

| Diluent system | Phase Disengagement time, s Phase continuity | |
|---|---|---|
| | Organic | Aqueous |
| 100% Shellsol ® D70 | 45 | 165 |
| 80 vol-% Shellsol ® D70, 20 vol-% Neste Renewable Isoalkane | 46 | 110 |

The results with the stressed organic phase are in line with the results shown in Example 2. The renewable isoparaffines containing diluent (Neste renewable isoalkane) gives faster phase separation in the copper solvent extraction than the conventional organic diluent. Furthermore, the result implies that the renewable isoparaffinic diluent is less subject to diluent degradation. No oxygenated compounds were detected from the used diluent sample containing 80 vol-% Shellsol® D70 and 20 vol-% Neste Renewable Isoalkane as verified with GC-MS analysis.

Example 4

Evaporation of volatile organic compounds (VOC) from the organic solvent phase is decreased in a system wherein the conventional organic extraction diluent is partly or totally replaced by Neste Renewable Isoalkane.

Figure 2:
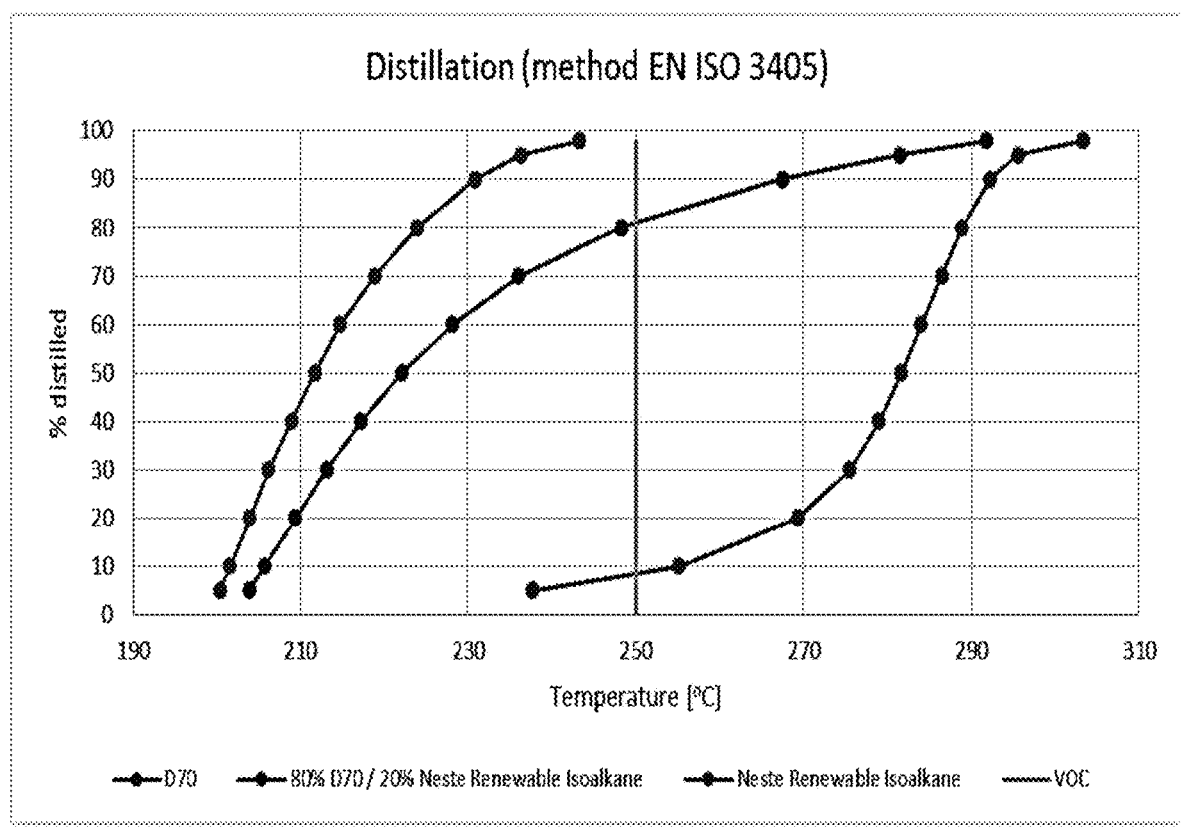
FIG. 2 shows the distillation curves of a conventional Shellsol® D70 organic diluent, a mixture of Shellsol® D70 solvent and Neste Renewable Isoalkane in ratio 80/20 and Neste Renewable Isoalkane as such.

The distillation curves of a conventional D70 organic diluent, a mixture of D70 diluent and Neste Renewable Isoalkane in ratio 80/20 and Neste Renewable Isoalkane as such is illustrated in FIG. 2. According to directive 2004/42/CEA VOC any organic compound having an initial boiling point less than or equal to 250° C. is measured at a standard atmospheric pressure of 101.3 kPa. The evaporated fraction below 250° C. can be seen from the curves as distillation point E-250° C. D70 is totally evaporated below 250° C., whereas for the mixture of 80% D70 and 20% Neste Renewable Isoalkane, the E-250° C. point is 81.4 vol-% and for pure Neste Renewable Isoalkane it is 7.9 vol-%. Thus, there is a clear reduction in the amount of VOC's as well as in the amount of evaporation loss of the diluent when the amount of Neste Renewable Isoalkane in the organic solvent phase is increased.

Example 5

Evaporation loss of organic solvent phase at the maximum operation temperature (40° C.) is significantly reduced in a system wherein conventional organic extraction diluent is replaced by Neste Renewable Isoalkane.

The test setup was as follows: Two parallel samples (77 g) of each tested liquid was placed on an open dish and let to evaporate at 40° C. under mild ventilation. Samples were weighed at certain intervals.

The evaporation loss of diluents at 40° C., which is the maximum use temperature of the diluent in the extraction process, is presented in FIG. 3. The decay of the organic reagent at a temperature over 40° C. is a limiting factor for the extraction process temperature. As seen from FIG. 3, the evaporation at 40° C. is very limited for Neste Renewable Isoalkane over 90% of the diluent remaining after 168 hours. Only 24% of the conventional Shellsol® D70 diluent remained after 168 h in the same conditions. The result clearly demonstrates the reduced need for makeup solvent in the system at 40° C.

Example 6

Phase disengagement tests with stressed organic phase were carried out in laboratory conditions. The tests were carried out so that the agitation after copper solvent extraction in the mixer was stopped and the separation of the two liquid phases was then visually monitored. The phase continuity was controlled during the mixing so that it was either organic phase continuous or aqueous phase continuous. The "Phase Disengagement time" was determined from the recorded height of the settled aqueous phase according to the method described on page 5 in "ACORGA® Extraction Reagents: Standard Test Methods/Phase Disengagement" in Cytec Technology Note, Cytec Industries 2005. The Phase Disengagement tests were made in the following conditions. Aqueous phase: 6 g/L Cu, 2 g/L $Fe^{3+}$, 60 g/L $SO_4$, initial pH=1.2, temperature 22° C., phase volume ratio 1:1. Organic phase: 20 vol-% Metal extraction reagent and 80 vol-% diluent. Metal extraction reagent used was ACORGA® M5640 by Cytec Solvay Group. Both phases were continuously mixed together in shaker unit at room temperature for 6 months. The phase separation time was measured from the 2-phase mixture at 0, 3 and 6 months on different continuities.

Prepared diluent consisted of either totally of Shellsol® D70 or of type 1 and type 2 Neste Renewable Isoalkane. Carbon number distribution of sample 1 used in the example was: 8 wt-% C15 hydrocarbons, 17 wt-% C16 hydrocarbons, 24 wt-% C17 hydrocarbons and 37 wt-% C18 hydrocarbons. Carbon number distribution of sample 2 used in the example was: 12 wt-% C15 hydrocarbons, 31 wt-% C16 hydrocarbons, 16 wt-% C17 hydrocarbons and 32 wt-% C18 hydrocarbons. Results are shown in FIG. 4.

The test demonstrates the oxidation stress resistance of the different diluents in solvent extraction process. The results show that the phase separation performance of Neste renewable diluent is similar to the performance of the reference diluent on aqueous continuity. Also the phase separation time of Neste diluent on organic continuity is at typical level seen in solvent extraction process.

Example 7

Kinetic and equilibrium laboratory tests with stressed organic phase were carried out according to standard procedures (see "ACORGA® Extraction Reagents: Standard Test Methods" In Cytec Technology Note, Cytec Industries 2005.) The organic stress test conditions were: Aqueous phase: 6 g/L Cu, 2 g/L Fe3+, 60 g/L SO4, initial pH=1.2, temperature 22° C., phase volume ratio 1:1. Organic phase: 20 vol-% Metal extraction reagent and 80 vol-% diluent. Metal extraction reagent used was ACORGA® M5640 by Cytec Solvay Group. Both phases were continuously mixed together in shaker unit at room temperature for 6 months. The loading and stripping kinetics performance of the diluents were measured after 6 months using the organic from the stress phase. The synthetic aqueous phase used in loading kinetics test was the same aqueous solution used in stress test. Phase volume ratio 1:1. The synthetic aqueous phase used in stripping kinetics test was 33 g/L Cu, 180 g/L $H_2SO_4$, temperature 22° C., phase volume ratio 1:1.

Prepared diluent consisted of either totally of Shellsol® D70 or Neste Renewable Isoalkane (sample 1 and sample 2). Carbon number distribution of sample 1 used in the example was: 8 wt-% C15 hydrocarbons, 17 wt-% C16 hydrocarbons, 24 wt-% C17 hydrocarbons and 37 wt-% C18 hydrocarbons. Carbon number distribution of sample 2 used in the example was: 12 wt-% C15 hydrocarbons, 31 wt-% C16 hydrocarbons, 16 wt-% C17 hydrocarbons and 32 wt-% C18 hydrocarbons. Results of the kinetic experiments are shown in FIG. 5.

The loading and stripping kinetics results of the diluents after stress resistance test show that the performance Neste Renewable diluent is suitable for the solvent extraction process. Also the iron/copper selectivity was measured to be at same level in all kinetics tests.

It will be obvious to a person skilled in the art that, as the technology advances, the inventive concept can be implemented in various ways. The invention and its embodiments are not limited to the examples described above but may vary within the scope of the claims.

The invention claimed is:

1. A biobased composition for liquid-liquid extraction of metals, the biobased composition comprising:
   5 vol-%-40 vol-% metal extraction reagent; and
   60 vol-%-95 vol % diluent, wherein the diluent includes:
   10 wt %-100 wt % of a first organic diluent containing hydrocarbons having 80 wt %-98 wt % $C_{15}$-$C_{20}$ hydrocarbons with at least 60 wt % isoparaffins from a total amount of the hydrocarbons; and
   optionally, 0 wt %-90 wt % of a second organic diluent component having more than 10 wt % naphthenes;
   wherein a $^{14}C$ isotope content of the first organic diluent is more than 90%.

2. The composition of claim 1, wherein the first organic diluent comprises:
   0 wt %-5 wt % naphthenes, and 95 wt %-100 wt % paraffins.

3. The composition of claim 2, wherein the first organic diluent comprises: paraffins, wherein of the paraffins 5 wt %-15 wt % is $C_{15}$ hydrocarbons, 10 wt %-35 wt % is $C_{16}$ hydrocarbons, 10 wt %-30 wt % is $C_{17}$ hydrocarbons, 25 wt % 45 wt % is $C_{18}$ hydrocarbons, more than 0 wt %-5 wt % is $C_{19}$ hydrocarbons and more than 0 wt %-5 wt % is $C_{20}$ hydrocarbons.

4. The composition of claim 2, comprising:
   0 wt %-2 wt % naphthenes, and 98 wt %-100 wt % paraffins.

5. The composition of claim 1, wherein a total amount of isoparaffins in the first organic diluent is at least 85 wt %.

6. The composition of claim 1, wherein the first organic diluent comprises:
   $C_{15}$ hydrocarbons having 5 wt %-20 wt % n-paraffins and 80 wt %-95 wt % i-paraffins;
   $C_{16}$ hydrocarbons having 0.5 wt %-15 wt % n-paraffins and 85 wt %-99.5 wt % i-paraffins;
   $C_{17}$ hydrocarbons having 3 wt %-15 wt % n-paraffins and 85 wt %-97 wt % i-paraffins;
   $C_{18}$ hydrocarbons having 0.1 wt %-10 wt % n-paraffins and 90 wt %-99.9 wt % i-paraffins;
   $C_{19}$ hydrocarbons having 0.1 wt %-15 wt % n-paraffins and 85 wt %-99.9 wt % i-paraffins; and
   $C_{20}$ hydrocarbons having 0.1 wt %-10 wt % n-paraffins and 90 wt %-99.9 wt % i-paraffins.

7. The composition of claim 1, wherein the amount of metal extraction reagent is 15 vol-%-25 vol-% of the composition.

8. The composition of claim 7, wherein the amount of first organic diluent is 10 wt %-90 wt %, and the amount of second organic diluent is 10 wt %-90 wt % of the diluent.

9. The composition of claim 7, wherein the amount of first organic diluent is 10 wt %-30 wt %, and the amount of second organic diluent is 70 wt %-90 wt % of the diluent.

10. The composition of claim 1, wherein the amount of first organic diluent is 10 wt %-90 wt %, and the amount of second organic diluent is 10-90 wt % of the diluent.

11. The composition of claim 1, wherein the amount of first organic diluent is 10 wt %-30 wt %, and the amount of second organic diluent is 70 wt %-90 wt % of the diluent.

12. The composition of claim 1, wherein the metal extraction reagent is hydroxyoxime.

13. The composition of claim 1, comprising 10 wt %-50 wt % naphthenes.

14. The composition of claim 1, wherein the $^{14}C$ isotope content of the first organic diluent is more than 99%.

15. A method of extracting metals with a biobased composition, the method comprising:
   liquid-liquid extracting a metal with the biobased composition having a metal extraction reagent and a first organic diluent containing 80 wt %-98 wt % $C_{15}$-$C_{20}$ hydrocarbons having at least 60 wt % isoparaffins from a total amount of hydrocarbons,
   wherein a $^{14}C$ isotope content of the first organic diluent is more than 90%.

16. The method of extracting metals with a biobased composition, according to claim 15, wherein the metal is copper.

* * * * *